(12) United States Patent
Evans

(10) Patent No.: US 6,974,559 B2
(45) Date of Patent: Dec. 13, 2005

(54) APPARATUS FOR METERING CATALYST IN A FLUID CATALYTIC CRACKING CATALYST INJECTION SYSTEM

(75) Inventor: Martin Evans, Tolland, CT (US)

(73) Assignee: Intercat Equipment, Inc., Sea Girt, NJ (US)

(*) Notice: Subject to any disclaimer, the term of this patent is extended or adjusted under 35 U.S.C. 154(b) by 139 days.

(21) Appl. No.: 10/374,450

(22) Filed: Feb. 26, 2003

(65) Prior Publication Data

US 2004/0166032 A1    Aug. 26, 2004

(51) Int. Cl.[7] .......................... G05D 9/00; G05D 16/00
(52) U.S. Cl. ...................... 422/110; 422/105; 422/107; 422/108; 422/111; 422/112; 422/139
(58) Field of Search ................ 422/105, 107, 422/108, 110, 111, 112, 113, 139, 140, 141, 422/145; 208/146, 152

(56) References Cited

U.S. PATENT DOCUMENTS

| | | | |
|---|---|---|---|
| 3,850,582 A * | 11/1974 | Luckenbach ................ 422/116 |
| 5,389,236 A | 2/1995 | Bartholic et al. ............ 208/152 |
| 5,810,045 A | 9/1998 | Evans ......................... 137/312 |
| 5,900,383 A * | 5/1999 | Davis et al. ................... 502/22 |
| 6,358,401 B1 | 3/2002 | Evans ......................... 208/152 |

OTHER PUBLICATIONS

Everlasting Valve Company, www.everlastingvalveco.com, printed Feb. 6, 2003.
ADPI C-Engine, www.adpi.com/C-Engine.htm, printed Nov. 15, 2002.
"IMS to Control Room", Dwg S-29, Sheet 1, Intercat, Savannah, Georgia, Nov. 26, 2001.

* cited by examiner

Primary Examiner—Alexa Doroshenk
(74) Attorney, Agent, or Firm—Keith Taboada, Esq.; Moser, Patterson & Sheridan, LLP.

(57) ABSTRACT

A method and apparatus for metering catalyst in a fluid catalytic cracking catalyst injection system are provided. In one embodiment, apparatus for metering catalyst in a fluid catalytic cracking catalyst injection system includes a low pressure storage vessel coupled to a pressure vessel that defines a high pressure side of the apparatus, where the determination of the amount of catalyst transferred is made on the low pressure side of the apparatus.

16 Claims, 8 Drawing Sheets

APPARATUS FOR METERING CATALYST IN A FLUID CATALYTIC CRACKING CATALYST INJECTION SYSTEM

RELATED APPLICATIONS

This application is related to U.S. patent application Ser. No. 10/304,670, filed Nov. 26, 2002, and U.S. patent application Ser. No. 10/320,064, filed Dec. 16, 2002, both of which are hereby incorporated by reference in their entirety.

BACKGROUND OF THE INVENTION

1. Field of the Invention

Embodiments of the invention generally relate to a method and apparatus for metering catalyst in a fluid catalytic cracking catalyst injection system and the like.

2. Description of the Related Art

FIG. 1 is a simplified schematic of one embodiment of a conventional fluid catalytic cracking system 130. The fluid catalytic cracking system 130 includes a fluid catalytic cracking (FCC) unit 110 coupled to a catalyst injection system 100, an oil feed stock source 104, an exhaust system 114 and a distillation system 116. One or more catalysts from the catalyst injection system 100 and oil from the oil feed stock source 104 are delivered to the FCC unit 110. The oil and catalysts are combined to produce an oil vapor that is collected and separated into various petrochemical products in the distillation system 116. The exhaust system 114 is coupled to the FCC unit 110 and is adapted to control and/or monitor the exhausted byproducts of the fluid cracking process.

The catalyst injection system 100 may include a main catalyst injector 102 and one or more additive injectors 106. The main catalyst injector 102 and the additive injector 106 are coupled to the FCC unit 110 by a process line 122. A fluid source, such as a blower or air compressor 108, is coupled to the process line 122 and provides pressurized fluid, such as air, that is utilized to carry the various powdered catalysts from the injectors 102, 106 through the process line 122 where they are combined with oil from the oil feed stock source 104 and delivered into the FCC unit 110.

FIG. 2 is one embodiment of a conventional additive injector 106. The additive injector 106 includes a pressure vessel 220 and a low pressure storage vessel 240. The pressure vessel 220 is coupled to one or more load cells 210 for weighing the catalyst that will be introduced into the FCC unit 110 through the process line 122. In operation, the catalyst is dispensed into the pressure vessel 220 at atmospheric pressure from the low pressure storage vessel 240. The pressure vessel 220 is subsequently weighed to determine the amount of catalyst loaded therein. The pressure vessel 220 is then pressurized by a pressure control device 228 coupled to the vessel 220 to a level that facilitates movement of the pressurized catalyst into process line 122 and then into the FCC unit 110. If the pressure vessel 220 is supported by any of the structural components surrounding it, other than the load cells 210 (such as pipes, electrical conduits, and the like), those components will prevent the load cells 210 from accurately measuring the weight of catalyst added to the pressure vessel 220, and ultimately into the FCC unit 100. Therefore, in order to obtain a reasonably accurate measure of the catalyst, the pressure vessel 220 must not be supported by other components of the system.

To isolate the pressure vessel 220 from the components coupled thereto, flexible connectors, such as bellows 230, are used to couple the pressure vessel 220 to the low pressure vessel 240, the process line 122, and other surrounding components. The bellows 230 allow the pressure vessel 220 to "float" on the load cells 210 so a more accurate reading may be obtained. However, use of flexible bellows 230 does not reliably insure accurate weight measurement of the pressure vessel 220. For example, the weight of the pressure vessel 220 is still slightly supported by the flexible bellows 230—a problem compounded by the fact that a plurality of bellows 230 must be utilized to isolate the pressure vessel 220 from the various components coupled thereto. Therefore, the determination of the weight of the catalyst added to the pressure vessel 220 is still not accurate. Moreover, due to the operating pressures and potentially explosive atmosphere, bellows meeting operational standards are quite expensive and wear quickly, resulting in the drift of weight readings, catalyst dust leaks and associated environmental issues, as well as necessitating costly process downtime and bellows replacement.

FIG. 3 is another embodiment of an additive injector 300. The injector 300 includes a high pressure storage vessel 340 coupled by a metering valve 330 to the process line 122. The metering valve 330 may be actuated to allow a predefined amount of catalyst to be introduced into the process line 122 and combine with the oil from the oil feed stock source 104 before entering the FCC unit 110. The high pressure storage vessel 340 contains a bulk supply of catalyst, for example, from about 1 to about 20 tons of catalyst, and is maintained at a pressure between about 50 to about 60 pounds per square inch (psi) by a pressure control device 320. As such, the pressure vessel 340 is subject to regulatory construction standards which cause the vessel to be relatively expensive as compared to a comparably sized, low pressure storage vessel. The high pressure vessel 340 is coupled to a plurality of load cells 310 which enable the weight of the high pressure storage vessel 340 to be determined. The weight of the catalyst injected is determined by comparing the weight of the high pressure storage vessel 340 before and after catalyst injection.

Metering catalyst in the manner described with reference to FIG. 3 eliminates the need for bellows used to isolate the pressure vessel. However, large high pressure storage vessels are very expensive. Therefore, there is a need for a method and apparatus for metering catalyst in a fluid catalytic cracking catalyst injection system that minimizes the cost of ownership.

SUMMARY OF THE INVENTION

A method and apparatus for metering catalyst in a fluid catalytic cracking catalyst injection system are provided. In one embodiment, apparatus for metering catalyst in a fluid catalytic cracking catalyst injection system includes a low pressure storage vessel coupled to a pressure vessel that defines a high pressure side of the apparatus where the determination of the amount of catalyst transferred is made on the low pressure side of the apparatus.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
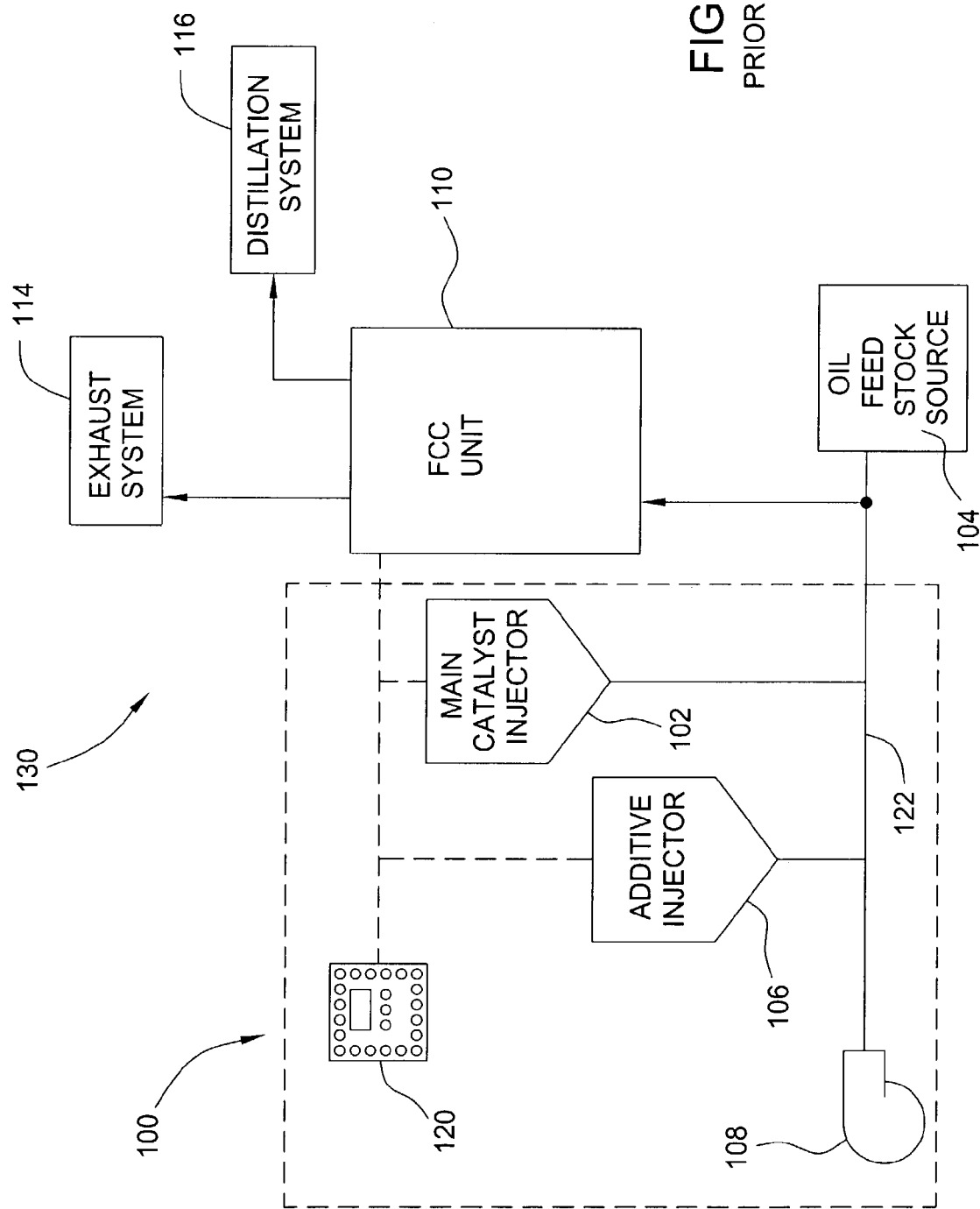
FIG. 1 is a simplified schematic view of a conventional fluid catalytic cracking system.
Figure 2:
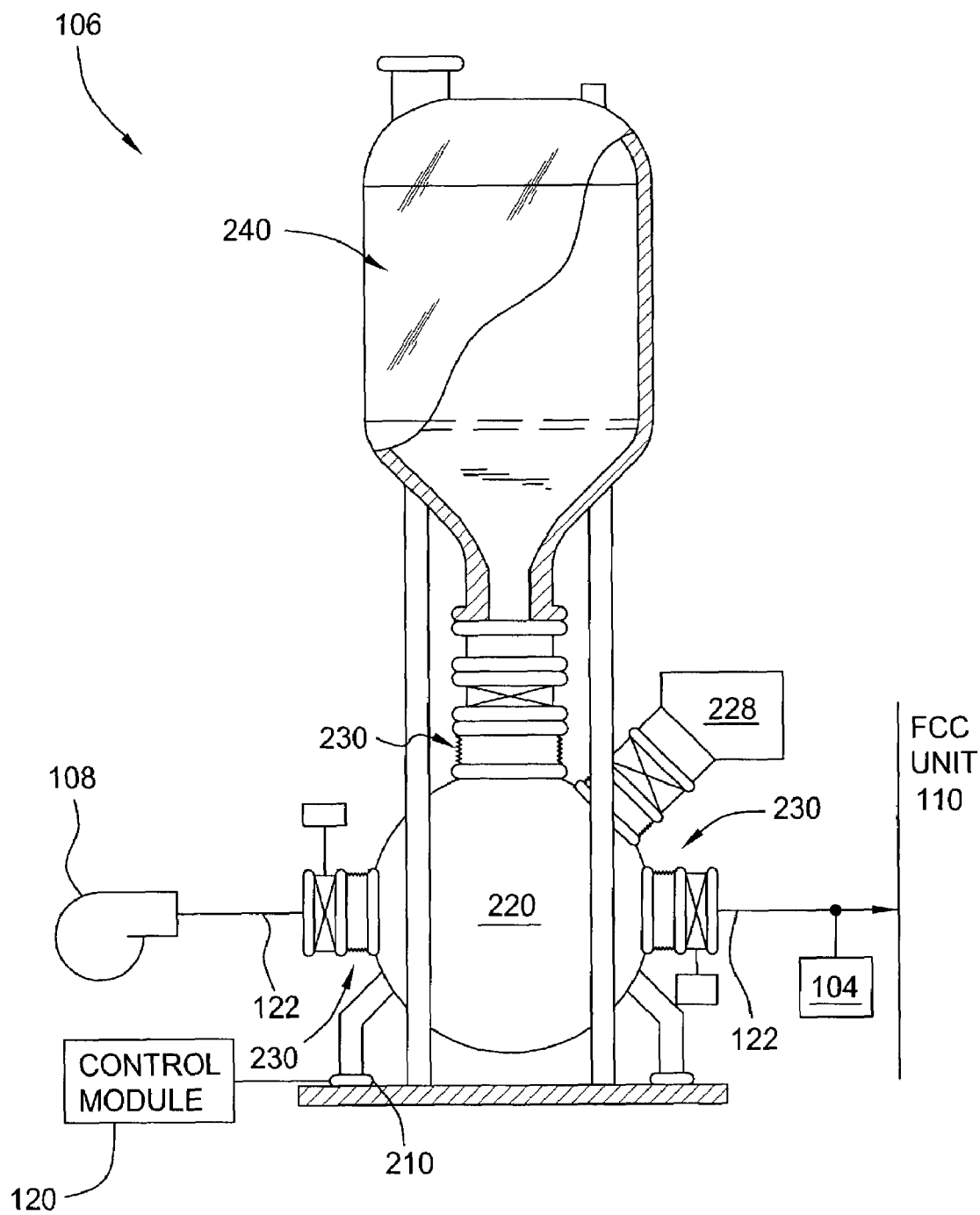
FIG. 2 is a simplified elevation view of one embodiment of a conventional catalyst injector having a low pressure storage vessel.
Figure 3:
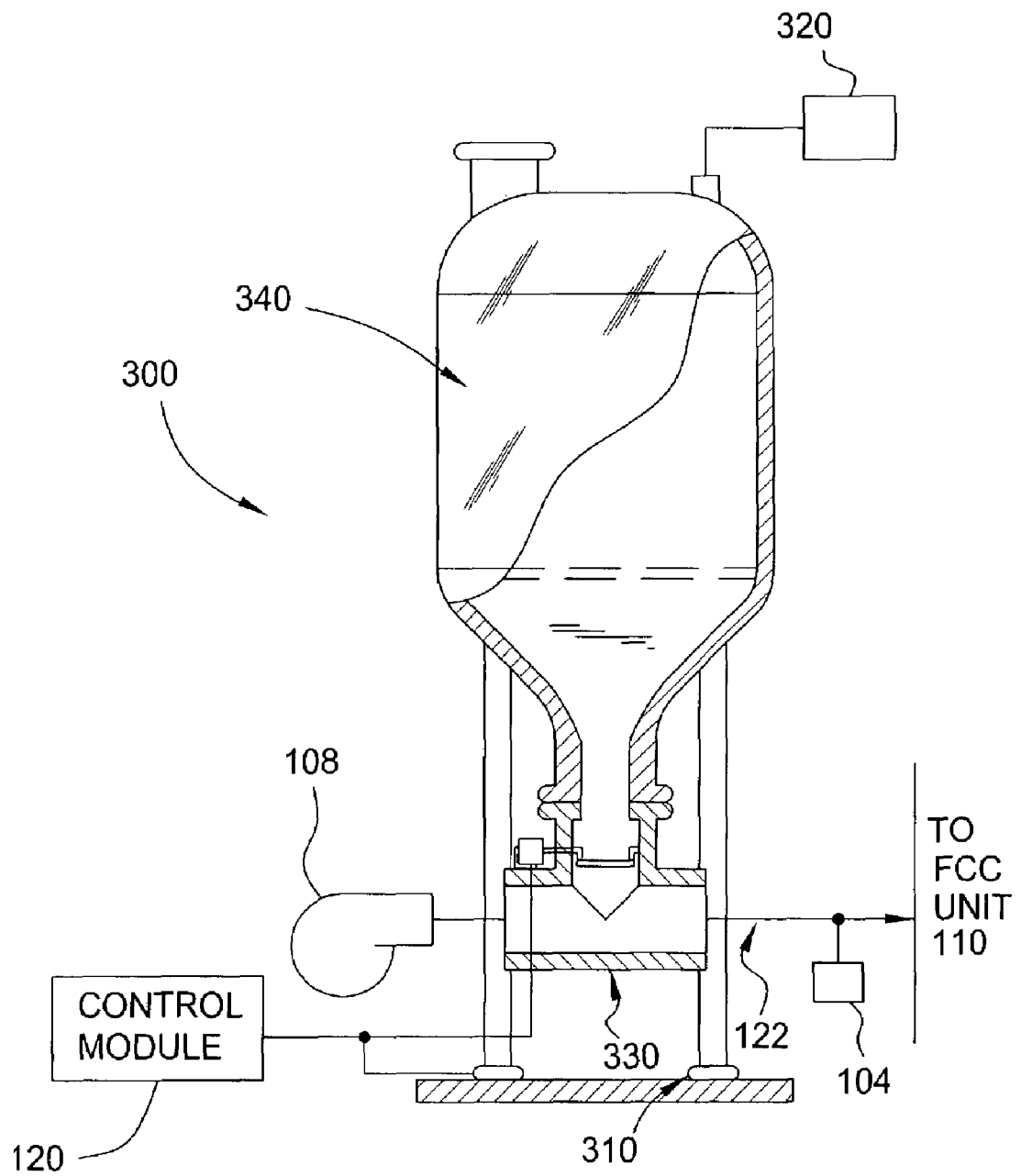
FIG. 3 is a simplified elevation view of another embodiment of a conventional catalyst injector having a high pressure storage vessel.
Figure 4:
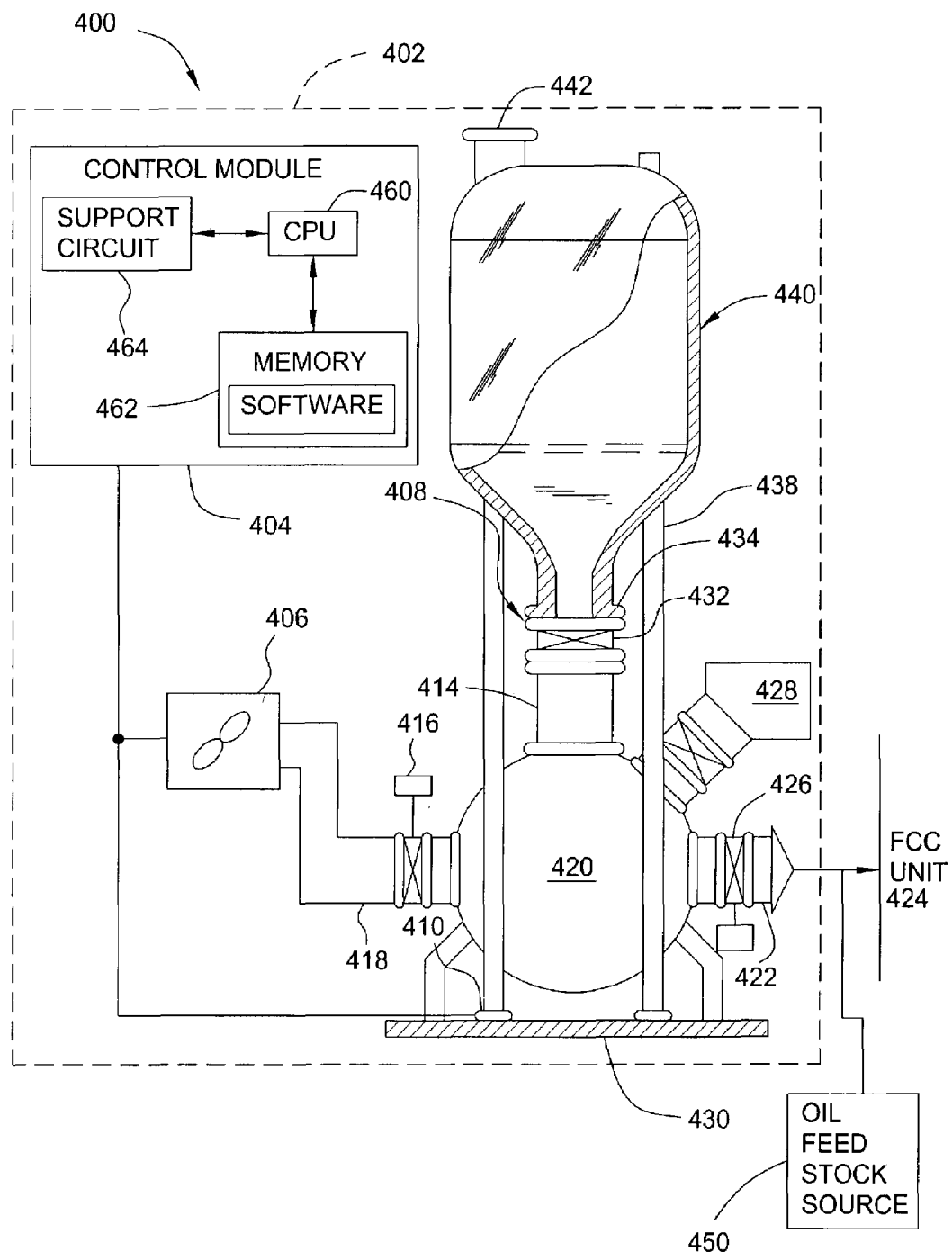
FIG. 4 is a simplified elevation view of a fluid catalytic cracking system illustrating a catalyst metering system in accordance with one embodiment of the present invention.

FIG. 4 depicts one embodiment of a fluid catalytic cracking (FCC) system 400 comprising an injection system 402 and oil feed stock source 450 coupled to an FCC unit 424. The FCC unit 424 is adapted to promote catalytic cracking of petroleum feed stock provided from the source 450 and may be configured in a conventional manner. The injection system 402 is coupled to the FCC unit 424 and is configured to inject one or more catalysts into the FCC unit 424 to control processing attributes such as the ratio of products recovered in a distiller of the FCC unit 424 and/or to control the emissions from the FCC unit 424. The injection system 402 includes a control module 404 to control the rates and/or amounts of catalyst provided to the FCC unit 424 by the injection system 402.

The control module 404 has a central processing unit (CPU) 460, memory 462, and support circuits 464. The CPU 460 may be one of any form of computer processor that can be used in an industrial setting for controlling various chambers and subprocessors. The memory 462 is coupled to the CPU 460. The memory 462, or computer-readable medium, may be one or more of readily available memory such as random access memory (RAM), read only memory (ROM), floppy disk, hard disk, or any other form of digital storage, local or remote. The support circuits 464 are coupled to the CPU 460 for supporting the processor in a conventional manner. These circuits include cache, power supplies, clock circuits, input/output circuitry, subsystems, and the like. In one embodiment, the control module 404 is a programmable logic controller (PLC), such as those available from GE Fanuc. However, from the disclosure herein, those skilled in the art will realize that other control modules such as microcontrollers, microprocessors, programmable gate arrays, and application specific integrated circuits (ASICs) may be used to perform the controlling functions of the control module 404. One control module 404 that may be adapted to benefit from the invention is described in the previously incorporated U.S. patent application Ser. Nos. 10/304,670 and 10/320,064.

In one embodiment, the injection system 402 includes a storage vessel 440 coupled to a metering device 408. The metering device 408 is coupled to the control module 404 so that an amount of catalyst delivered to the FCC unit 424 may be monitored and/or metered. The storage vessel 440 is a container adapted to store catalyst therein at substantially atmospheric pressures and has an operational pressure of between about zero to about 30 pounds per square inch. The storage vessel 440 has a fill port 442 and a discharge port 434. The discharge port 434 is typically positioned at or near a bottom of the storage vessel 440.

The metering device 408 is coupled to the discharge port 434 to control the amount of catalyst transferred from the storage vessel 440 to the pressure vessel 420 through a catalyst delivery line 414. The metering device 408 may be a shut-off valve, rotary valve, mass flow controller, pressure vessel, flow sensor, positive displacement pump, or other device suitable for regulating the amount of catalyst dispensed from the storage vessel 440 into the pressure vessel 420 for injection into the FCC unit 424. The metering device 408 may determine the amount of catalyst supplied by weight, volume, time of dispense, or by other means. Depending on the catalyst requirements of the FCC system 400, the metering device 408 may be configured to provide from about 5 to about 4000 pounds per day of additive-type catalysts (process control catalyst) or may be configured to provide from about 1 to about 20 tons per day of main catalyst. The metering device 408 typically delivers catalysts over the course of a planned production cycle, typically 24 hours, in multiple shots of predetermined amounts spaced over the production cycle. However, catalysts may also be added in an "as needed" basis. In the embodiment depicted in FIG. 4, the metering device 408 is a control valve 432 that regulates the amount of catalyst delivered from the storage vessel 440 to the FCC unit 424 by a timed actuation. Control valves suitable for use as a metering device are available from InterCat Equipment Inc., located in Sea Girt, N.J.

The injection system 402 may also include one or more sensors for providing a metric suitable for determining the amount of catalyst passing through the metering device 408 during each transfer of catalyst to the pressure vessel 420. The sensors may be configured to detect the level (i.e., volume) of catalyst in the storage vessel 440, the weight of catalyst in the storage vessel 440, the rate of catalyst movement through the storage vessel 440, discharge port 434, metering device 408, and/or catalyst delivery line 414, or the like.

In the embodiment depicted in FIG. 4, the sensor is a plurality of load cells 410 adapted to provide a metric indicative of the weight of catalyst in the storage vessel 440. The load cells 410 are respectively coupled to a plurality of legs 438 that support the storage vessel 440 above a mounting surface 430. Each of the legs 438 has one of the plurality of load cells 410 coupled thereto. From sequential data samples obtained from the load cells 410, the control module 404 may resolve the net amount of transferred catalyst after each actuation of the metering device 408 (e.g., the control valve 432). Additionally, the cumulative amount of catalyst dispensed over the course of the production cycle may be monitored so that variations in the amount of catalyst dispensed in each individual cycle may be compensated for by adjusting the delivery attributes of the metering device 408, for example, by changing the open time of the control valve 432 to allow more (or less) catalyst to pass therethrough and into the pressure vessel 420 for ultimate injection into the FCC unit 424.

Alternatively, the sensor may be a level sensor (not shown) coupled to the storage vessel 440 and adapted to detect a metric indicative of the level of catalyst within the storage vessel 440. The level sensor may be an optical transducer, a capacitance device, a sonic transducer or other device suitable for providing information from which the level or volume of catalyst disposed in the storage vessel 440 may be resolved. By utilizing sensed differences in the levels of catalyst disposed within the storage vessel 440 between dispenses, the amount of catalyst injected may be resolved for a known storage vessel geometry.

Alternatively, the sensor may be a flow sensor (not shown) adapted to detect the flow of catalyst through one of the components of the catalyst injection system 402. The flow sensor maybe a contact or non-contact device and may be mounted to the storage vessel 440 or the catalyst delivery line 414 coupling the storage vessel 440 to the pressure vessel 420. For example, the flow sensor may be a sonic flow meter or capacitance device adapted to detect the rate of entrained particles (i.e., catalyst) moving through the catalyst delivery line 414.

Although the injection system 402 described above is shown configured to provide catalyst from a single low pressure storage vessel 440, the invention contemplates utilizing one or more injection systems coupled to the FCC unit 424 to introduce multiple catalysts from a plurality of storage vessels. Each of these injection systems may be controlled by either common or independent control modules.

The pressure vessel 420 is rigidly coupled to the mounting surface 430, as load cells are not needed to determine the weight of the pressure vessel 420. The term "rigidly" is to include mounting devices, such as vibration dampers and the like, but to exclude mounting devices that "float" the pressure vessel to facilitate weight measurement thereof. The pressure vessel 420 has an operational pressure of about 0 to about 100 pounds per square inch, and is coupled to a fluid source 406 by a first conduit 418. The first conduit 418 includes a shut-off valve 416 that selectively isolates the fluid source 406 from the pressure vessel 420. A second conduit 422 couples the pressure vessel 420 to the FCC unit 424 and includes a second shut-off valve 426 that selectively isolates the pressure vessel 420 substantially from the FCC unit 424. The shut-off valves 416 and 426 are generally closed to allow the pressure vessel 420 to be filled with catalyst from the storage vessel 440 at substantially atmospheric pressure.

Once the catalyst is dispensed into the pressure vessel 420, the control valve 432 is closed and the interior of the pressure vessel 420 is pressurized by a pressure control system 428 to a level that facilitates injection of the catalyst from the pressure vessel 420 into the FCC unit 424, typically at least about 20 pounds per square inch. After the loaded pressure vessel 420 is pressurized by the pressure control system 428, the shut-off valves 416 and 426 are opened, allowing air or other fluid provided by the fluid source 406 to enter the pressure vessel 420 through the first conduit 418 and carry the catalyst out of the pressure vessel 420 through the second conduit 422 to the FCC unit 424. In one embodiment, the fluid source 406 provides air at about 60 to about 100 psi (about 4.2 to about 7.0 kg/cm2).

In operation, the injection system 402 periodically dispenses and injects a known quantity of catalyst into the FCC unit 424. Catalyst is filled into the low pressure storage vessel 440 through the fill port 442 located in an upper portion of the storage vessel 440. The weight of the storage vessel, including any catalyst residing therein, is obtained by interpreting data obtained from the load cells 410.

In one embodiment, a predefined quantity of catalyst in the storage vessel 440 is transferred into the pressure vessel 420 by selectively opening the control valve 432 for a defined amount of time. After the catalyst has been transferred, the weight of the storage vessel 440 is obtained once again, and the exact quantity of catalyst added determined by subtracting the current weight from the previous measurement. Once the catalyst is transferred to the pressure vessel 420, the pressure inside the pressure vessel 420 is elevated by the pressure control system 428 to, typically, at least about 20 psi. After operating pressure is reached, valves 416 and 426 are opened. This allows fluid supplied by the fluid source 406, typically air at approximately 60 psi, to flow through the pressure vessel 420 and carry the catalyst to the FCC unit 424.

This metering system is advantageous over the prior art in numerous respects. For example, bulk storage of the catalyst at high pressure is not required, thereby allowing the storage vessel 440 to be fabricated less expensively as compared to pressurized bulk storage containers of some conventional systems. Furthermore, as the determination of the amount of catalyst being dispensed is made at the low pressure side of the system 402 (e.g., in the low pressure storage vessel or conduit between the storage vessel and pressure vessel), the pressure vessel 420 does not need to be isolated by bellows in order to obtain catalyst weight information, allowing for more accurate weight readings as well as a more robust and less costly system.

Figure 5:
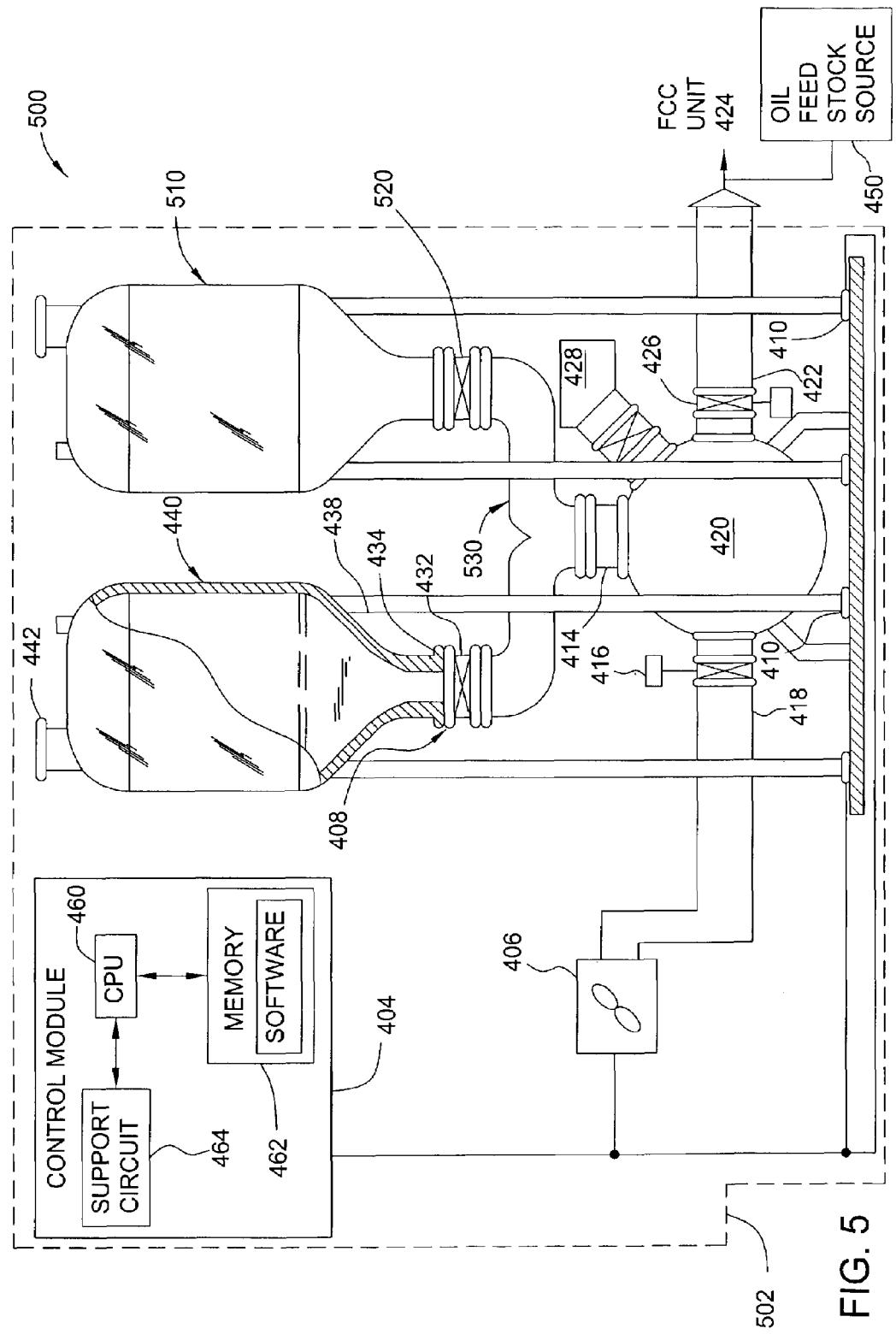
FIG. 5 is a simplified elevation view of a fluid catalytic cracking system illustrating a catalyst metering system in accordance with another embodiment of the present invention.

FIG. 5 depicts another embodiment of a fluid catalytic cracking (FCC) system 500 comprising an injection system 502 and oil feed stock source 450 coupled to an FCC unit 424. The injection system 502 is adapted to provide multiple catalysts to the FCC unit 424. The injection system 502 includes a control module 404 for controlling the rates and/or amounts of catalyst provided to the FCC unit 424 by the injection system 502, a fluid handler 406 for injecting the catalyst into the FCC unit 424, and a pressure vessel 420 coupled to a plurality of storage vessels, illustratively shown in one embodiment as a first low pressure storage vessel 440 and a second low pressure storage vessel 510. It is contemplated that any number of low pressure storage vessels may be coupled to a single pressure vessel 420 for injection catalyst at a higher pressure.

The storage vessels 440, 510 may be configured to deliver the same or different catalysts to the FCC unit 424 and operate substantially similar to storage vessel 440, described above. The storage vessels 440, 510 are coupled to a manifold 530 which directs the plurality of catalysts to a common catalyst delivery line 414 for delivery into the pressure vessel 420. Alternately, each storage vessel 440, 510 can be independently coupled to the pressure vessel 420. Each storage vessel 440, 510 is coupled to an independent metering device 432, 520 which controls the amount of catalyst delivered from each storage vessel 440, 510 to the pressure vessel 420 for injection into the FCC unit 424. In one embodiment, the metering device 520 is configured similar to the metering device 432 described above. In this configuration, the system 502 is capable of sequentially providing catalyst from a predefined one of the storage vessels 440, 510, or alternatively, blending measured amounts from each storage vessel 440, 510 in the pressure vessel 420 for injecting into the FCC unit 424 in a single shot.

Figure 6:
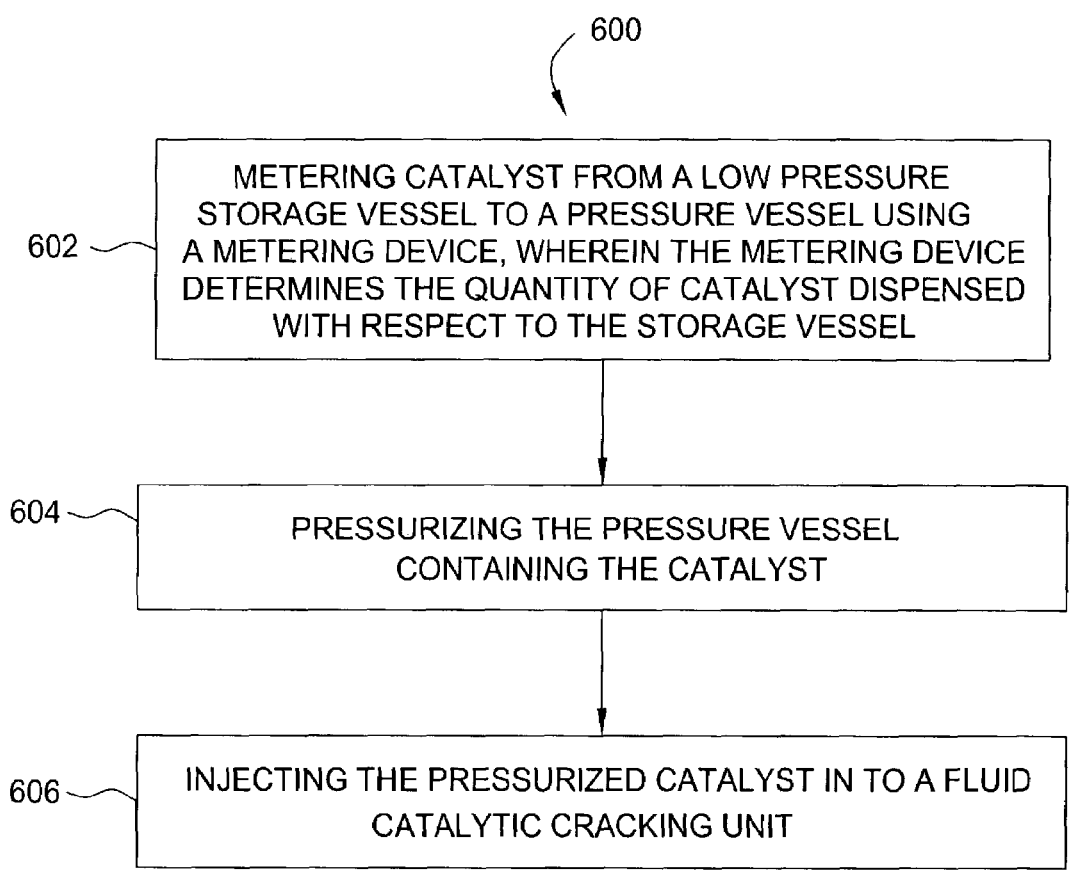
FIG. 6 is a flow diagram representing an inventive method for metering catalyst in a fluid catalytic cracking system.

FIG. 6 depicts a flow diagram of one embodiment of a method 600 for metering catalyst in a FCC catalyst injection system. The method 600 is generally stored in the memory of the control module 404, typically as a software routine. The software routine may also be stored and/or executed by a second CPU (not shown) that is remotely located from the hardware being controlled by the control module 404. Although the method 600 is discussed as being implemented as a software routine, some of the method steps that are disclosed therein may be performed in hardware as well as by the software controller, or manually. As such, the invention may be implemented in software as executed upon a computer system, in hardware as an application specific integrated circuit, or other type of hardware implementation, manually, or a combination of software, hardware, and/or manual steps.

The method 600 begins at step 602 where the catalyst is metered from a low pressure storage vessel 440 to a pressure vessel 420. In this step, the metering and determination of catalyst transferred to the pressure vessel 420 is performed outside the pressure vessel 420 by the metering device 408. For example, in the embodiment depicted in FIG. 4, step 602 is performed by the combination of the metering device 408 and the load cells 410 supporting the storage vessel 440 being utilized to determine the amount of catalyst transferred to the pressure vessel 420. The catalyst is dispensed from the storage vessel 440 into the pressure vessel 420 by temporarily opening the control valve 432. The weight of the storage vessel 440 is measured both before and after dispensing the catalyst by interpreting the output of the load cells 410 coupled to the legs 438 which support the storage vessel 440. The amount of catalyst transferred to the pressure vessel 420 is the difference between the weight of the storage vessel 440 before and after dispensing the catalyst. Alternatively, as discussed above, the catalyst metering device 408 may be a shut-off valve, rotary valve, mass flow controller, pressure vessel, flow sensor, positive displacement pump, or other device suitable for regulating the amount of catalyst dispensed from the storage vessel 440 for delivery to the FCC unit 424.

At step 604, the pressure vessel 420 containing the catalyst is pressurized by the pressure control system 428 to between about 10 to about 100 pounds per square inch. At step 606, the pressurized catalyst is injected into the FCC unit 424. In this step, valves 416, 427 open which allow the catalyst to be carried to the FCC unit 424 in a stream of fluid provided by the fluid source 406. In the embodiment depicted in FIG. 4, the pressure vessel 420 is pressurized to at least about 10 psi by the pressure control system 428. Once the pressure has been reached, valves 416 and 426 are opened, allowing the fluid in the first and second conduits 418, 422 to carry the catalyst into the FCC unit 424.

Figure 7:
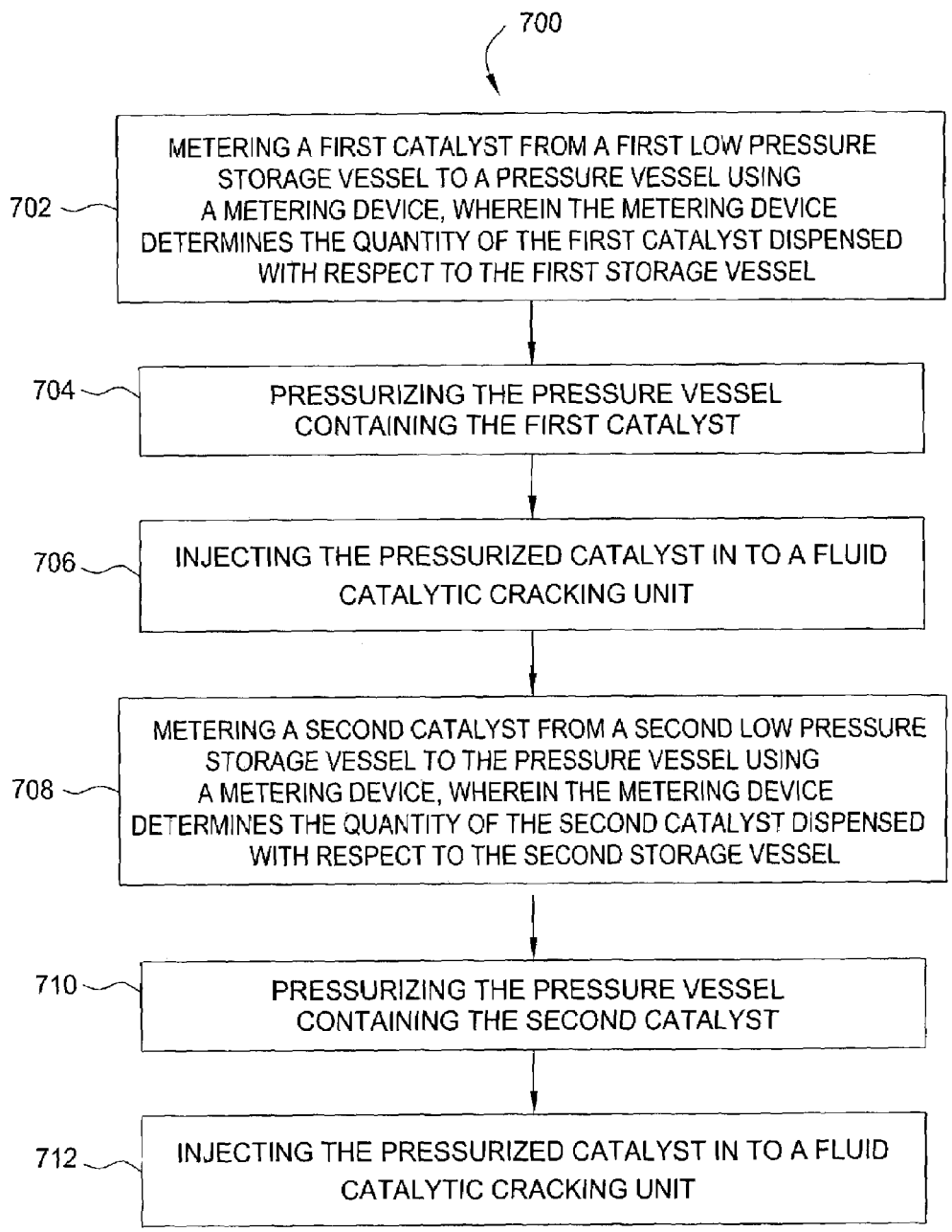
FIG. 7 is a simplified elevation view of a fluid catalytic cracking system illustrating a catalyst metering system in accordance with another embodiment of the invention.

FIG. 7 depicts a flow diagram of one embodiment of a method 700 for metering catalyst in a FCC catalyst injection system. The method 700 begins at step 702 where a first catalyst is dispensed from a first low pressure storage vessel 440 to a pressure vessel 420 using a metering device 432, wherein the metering device determines the quantity of the first catalyst dispensed with respect to the first storage vessel. At step 704, the pressure vessel 420 containing the first catalyst is pressurized. Then, at step 706, the pressurized catalyst is injected into a FCC unit 424.

The method continues at step 708, where a second catalyst is metered from a second low pressure storage vessel 510 to the pressure vessel 420 using a metering device 520, wherein the metering device determines the quantity of the second catalyst dispensed with respect to the second storage vessel. At step 710, the pressure vessel 420 containing the second catalyst is pressurized and finally, at step 712, the pressurized second catalyst is injected into the FCC unit 424. The method 700 contemplates the use of additional low pressure vessel which load the pressure vessel 420 in a predefined order, or as needed.

Figure 8:
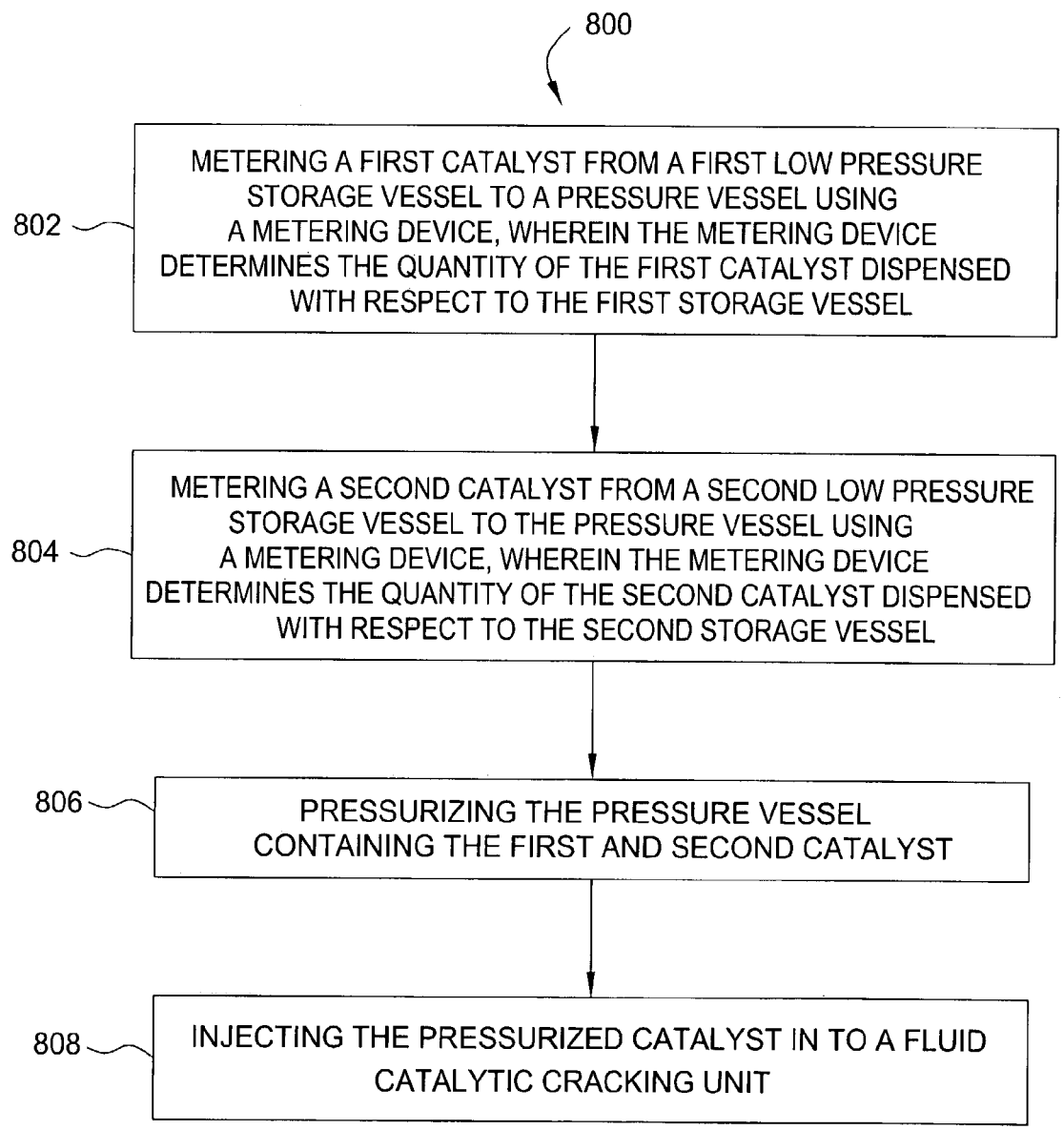
FIG. 8 is a simplified elevation view of a fluid catalytic cracking system illustrating a catalyst metering system in accordance with another embodiment of the present invention.

FIG. 8 depicts a flow diagram of one embodiment of a method 800 for metering catalyst in a FCC catalyst injection system. In this method, beginning at step 802, a first catalyst is metered from a first low pressure storage vessel 440 to a pressure vessel 420 using a metering device 432, wherein the metering device determines the quantity of the first catalyst dispensed with respect to the first storage vessel. At step 804, a second catalyst is metered from a second low pressure storage vessel 510 to the pressure vessel 420 using a metering device 520, wherein the metering device determines the quantity of the second catalyst dispensed with respect to the second storage vessel. At step 806, the pressure vessel 420 containing the first and second catalysts is pressurized and at step 808, the pressurized catalysts are injected into the FCC unit 424 as a single shot of catalyst. The method 800 contemplates the use of additional low pressure vessels which may provide mixtures of different catalyst as needed or per a predefined process sequence.

The methods described in FIGS. 7 and 8 allow for multiple catalysts to be injected into the FCC unit as needed. For example, one catalyst may control emissions from the cracking process and another catalyst may control the resultant product mix produced by the FCC unit. This allows greater process flexibility with reduced capital expenditures.

Thus, an injection system has been provided that facilitates more accurate metering of catalyst and reduces problems associated with bellows used in some injection systems of the prior art. Moreover, the inventive system is compatible with existing low pressure storage vessels and does not require expensive bellows to isolate the pressure vessel. Therefore the inventive system is substantially less expensive than the injection systems of the prior art.

Although the teachings of the present invention have been shown and described in detail herein, those skilled in the art can readily devise other varied embodiments that still incorporate the teachings and do not depart from the scope and spirit of the invention.

What is claimed is:

1. Apparatus for metering catalyst in a fluid catalytic cracking catalyst injection system, comprising:
   a low pressure storage vessel;
   a pressure vessel rigidly coupled to a supporting surface having an outlet adapted to be coupled to a fluid catalytic cracking unit and an inlet;
   a pressure control device coupled to the pressure vessel and configured to selectively pressurize the pressure vessel relative to the storage vessel; and
   a metering device coupling the storage vessel to the inlet of the pressure vessel.

2. The apparatus of claim 1, further comprising:
   at least one load cell adapted to provide a metric indicative of a weight of the storage vessel.

3. The apparatus of claim 2, wherein the metering device comprises:
   a control valve coupled to a discharge port in the storage vessel.

4. The apparatus of claim 3, further comprising:
   a control module coupled to the control valve and the at least one load cell, wherein the control module is adapted to control the operation of the control valve based at least in part upon the interpretation of signals received from the load cells.

5. The apparatus of claim 1, wherein the metering device comprises:
a dispensing device; and
at least one sensor adapted to provide a metric from which the amount of catalyst transferred from the low pressure storage vessel to the pressure vessel through the dispensing device may be resolved.

6. The apparatus of claim 5, wherein the dispensing device is at least one of a shut-off valve, rotary valve, or positive displacement pump.

7. The apparatus of claim 5, wherein the sensor is at least one of a optical transducer, capacitance device, sonic transducer, mass flow controller, or load cell.

8. The apparatus of claim 1, wherein the pressure control device is capable of increasing the pressure within the pressure vessel above at least 10 pounds per square inch.

9. The apparatus of claim 1, further comprising:
a fluid source rigidly coupled to the pressure vessel.

10. The apparatus of claim 1, further comprising:
a second low pressure storage vessel; and
a second metering device coupling the storage vessel to the pressure vessel.

11. The apparatus of claim 1, wherein the pressure control device is capable of increasing the pressure within the pressure vessel above at least 20 pounds per square inch.

12. Apparatus for metering catalyst in a fluid catalytic cracking catalyst injection system, comprising:
a low pressure storage vessel;
a pressure vessel having an outlet adapted to be coupled to a fluid catalytic cracking unit;
a control valve coupling a discharge port in the storage vessel to an inlet port of the pressure vessel; and
at least one load cell adapted to provide a metric indicative of a weight of the storage vessel.

13. The apparatus of claim 12, further comprising:
a pressure control device rigidly coupled to the pressure vessel and capable of increasing the pressure within the pressure vessel above at least 10 pounds per square inch; and
a fluid source rigidly coupled to the pressure vessel.

14. The apparatus of claim 12, further comprising:
a second low pressure storage vessel; and
a second metering device coupling the storage vessel to the pressure vessel.

15. Apparatus for metering catalyst in a fluid catalytic cracking catalyst injection system, comprising:
a low pressure storage vessel;
a pressure vessel rigidly coupled to a supporting surface and having an outlet adapted to be coupled to a fluid catalytic cracking unit and an inlet, the pressure vessel selectively isolatable from the storage vessel; and
a metering device coupling the storage vessel to the inlet of the pressure vessel.

16. Apparatus for metering catalyst in a fluid catalytic cracking catalyst injection system, comprising:
a low pressure storage vessel;
a pressure vessel rigidly coupled to a supporting surface and having an outlet adapted to be coupled to a fluid catalytic cracking unit and an inlet, the pressure vessel selectively isolatable from the storage vessel;
a metering device coupling the storage vessel to the in let of the pressure vessel; and
at least one sensor adapted to provide a metric from which the amount of catalyst transferred from the low pressure storage vessel to the pressure vessel through the dispensing device may be resolved.

* * * * *

UNITED STATES PATENT AND TRADEMARK OFFICE
CERTIFICATE OF CORRECTION

PATENT NO. : 6,974,559 B2 Page 1 of 1
DATED : December 13, 2005
INVENTOR(S) : Evans It is certified that error appears in the above-identified patent and that said Letters Patent is hereby corrected as shown below:

<u>Column 9,</u>
Line 14, delete "a" and insert -- an --.

<u>Column 10,</u>
Line 29, delete "in let" and insert -- inlet --.

Signed and Sealed this

Second Day of May, 2006

JON W. DUDAS
*Director of the United States Patent and Trademark Office*